United States Patent
Atsmon et al.

(10) Patent No.: US 12,061,965 B2
(45) Date of Patent: Aug. 13, 2024

(54) SYSTEM AND METHOD FOR GENERATING REALISTIC SIMULATION DATA FOR TRAINING AN AUTONOMOUS DRIVER

(71) Applicant: Cognata Ltd., Rehovot (IL)

(72) Inventors: Dan Atsmon, Rehovot (IL); Eran Asa, Petach-Tikva (IL); Ehud Spiegel, Petach-Tikva (IL)

(73) Assignee: Cognata Ltd., Rehovot (IL)

( * ) Notice: Subject to any disclaimer, the term of this patent is extended or adjusted under 35 U.S.C. 154(b) by 158 days.

(21) Appl. No.: 17/687,720

(22) Filed: Mar. 7, 2022

(65) Prior Publication Data

US 2022/0188579 A1     Jun. 16, 2022

Related U.S. Application Data

(63) Continuation of application No. 17/286,526, filed as application No. PCT/IL2019/051119 on Oct. 15, 2019, now Pat. No. 11,270,165.

(Continued)

(51) Int. Cl.
*G06V 10/82*     (2022.01)
*G06F 18/20*     (2023.01)
(Continued)

(52) U.S. Cl.
CPC ......... *G06N 3/006* (2013.01); *G06F 18/2148* (2023.01); *G06F 18/2193* (2023.01);
(Continued)

(58) Field of Classification Search
CPC .. G06K 9/6265; G06K 9/6227; G06K 9/6257; G06K 9/6277; G06K 9/00791;
(Continued)

(56) References Cited

U.S. PATENT DOCUMENTS

| | | |
|---|---|---|
| 10,031,526 B1 | 7/2018 | Li |
| 10,235,601 B1 | 3/2019 | Wrenninge et al. |

(Continued)

FOREIGN PATENT DOCUMENTS

| | | |
|---|---|---|
| CN | 103180884 | 6/2013 |
| CN | 105807630 | 7/2016 |

(Continued)

OTHER PUBLICATIONS

Communication Pursuant to Article 94(3) EPC Dated Apr. 18, 2023 From the European Patent Office Re. Application No. 19872360.3. (6 Pages).

(Continued)

*Primary Examiner* — Sheela C Chawan

(57) ABSTRACT

A method for training a model for generating simulation data for training an autonomous driving agent, comprising: analyzing real data, collected from a driving environment, to identify a plurality of environment classes, a plurality of moving agent classes, and a plurality of movement pattern classes; generating a training environment, according to one environment class; and in at least one training iteration: generating, by a simulation generation model, a simulated driving environment according to the training environment and according to a plurality of generated training agents, each associated with one of the plurality of agent classes and one of the plurality of movement pattern classes; collecting simulated driving data from the simulated environment; and modifying at least one model parameter of the simulation generation model to minimize a difference between a simulation statistical fingerprint, computed using the simulated driving data, and a real statistical fingerprint, computed using the real data.

27 Claims, 9 Drawing Sheets

Related U.S. Application Data

(60) Provisional application No. 62/746,607, filed on Oct. 17, 2018.

(51) Int. Cl.

| | | |
|---|---|---|
| *G06F 18/21* | (2023.01) | |
| *G06F 18/214* | (2023.01) | |
| *G06F 18/2415* | (2023.01) | |
| *G06N 3/006* | (2023.01) | |
| *G06N 5/043* | (2023.01) | |
| *G06N 20/00* | (2019.01) | |
| *G06T 7/00* | (2017.01) | |
| *G06V 10/74* | (2022.01) | |
| *G06V 10/774* | (2022.01) | |
| *G06V 10/776* | (2022.01) | |
| *G06V 10/80* | (2022.01) | |
| *G06V 20/56* | (2022.01) | |
| *G06V 20/70* | (2022.01) | |

(52) U.S. Cl.
CPC ........ *G06F 18/2415* (2023.01); *G06F 18/285* (2023.01); *G06N 5/043* (2013.01); *G06N 20/00* (2019.01); *G06T 7/0002* (2013.01); *G06V 10/761* (2022.01); *G06V 10/774* (2022.01); *G06V 10/776* (2022.01); *G06V 10/809* (2022.01); *G06V 10/82* (2022.01); *G06V 20/56* (2022.01); *G06V 20/70* (2022.01); *G06T 2207/30168* (2013.01)

(58) Field of Classification Search
CPC .... G06K 9/6292; G06K 9/6215; G06N 20/00; G06N 5/043; G06N 3/006; G06N 3/005; G06T 7/0002; G06T 2207/30168; G06T 11/00; G06T 13/20
USPC ................................................. 382/104, 100
See application file for complete search history.

(56) References Cited

U.S. PATENT DOCUMENTS

| | | | |
|---|---|---|---|
| 2013/0184928 | A1 | 7/2013 | Kerkhof et al. |
| 2016/0210775 | A1 | 7/2016 | Alaniz et al. |
| 2018/0164825 | A1 | 6/2018 | Matus |
| 2018/0247138 | A1 | 8/2018 | Kang |
| 2019/0251401 | A1 | 8/2019 | Shechtman et al. |
| 2020/0026416 | A1 | 1/2020 | Bala et al. |
| 2020/0320769 | A1 | 10/2020 | Chen et al. |
| 2021/0312244 | A1 | 10/2021 | Atsmon et al. |

FOREIGN PATENT DOCUMENTS

| | | | |
|---|---|---|---|
| CN | 107784709 | 3/2018 | |
| WO | WO 2017/079229 | 5/2017 | |
| WO | WO-2017079229 A1 * | 5/2017 | ............. B60L 15/20 |
| WO | WO 2018/002910 | 1/2018 | |
| WO | WO-2018002910 A1 * | 1/2018 | ............. G01C 11/04 |
| WO | WO 2020/079685 | 4/2020 | |

OTHER PUBLICATIONS

International Preliminary Report on Patentability Dated Apr. 29, 2021 From the International Bureau of WIPO Re. Application No. PCT/IL2019/051119. (13 Pages).

International Search Report and the Written Opinion Dated Mar. 12, 2020 From the International Searching Authority Re. Application No. PCT/IL2019/051119. (21 Pages).

Invitation to Pay Additional Fees Dated Jan. 22, 2020 From the International Searching Authority Re. Application No. PCT/IL2019/051119. (2 Pages).

Notice of Allowance Dated Nov. 5, 2021 from US Patent and Trademark Office Re. U.S. Appl. No. 17/286,526. (14 pages).

Restriction Official Action Dated Sep. 3, 2021 From the US Patent and Trademark Office Re. U.S. Appl. No. 17/286,526. (8 Pages).

Supplementary European Search Report and the European Search Opinion Dated Jul. 1, 2022 From the European Patent Office Re. Application No. 19872360.3. (8 Pages).

Dundar et al. "Domain Stylization: A Strong, Simple Baseline for Synthetic to Real Image Domain Adaption", ArXiv Preprint ArXiv:1807.09384v1, XP055925008, p. 1-10, Jul. 24, 2018.

Lee et al. "SPIGAN: Privileged Adversarial Learning From Stimulation", ArXiv Preprint ArXiv:1810.03756v1, XP055925129, p. 1-12, Oct. 9, 2018.

Lucic et al. "Are GANs Created Equal? A Large-Scale Study", ArXiv Preprint ArXiv:1711.10337v3, XP055925322, p. 1-19, Mar. 20, 2018.

English Summary Dated Jan. 31, 2023 of Notification of Office Action Dated Jan. 18, 2024 From the State Intellectual Property Office of the People's Republic of China Re. Application No. 2019800814301. (2 Pages).

Notification of Office Action and Search Report Dated Jan. 18, 2024 From the State Intellectual Property Office of the People's Republic of China Re. Application No. 2019800814301and Its Machine Translation of Office Action Into English. (24 Pages).

* cited by examiner

SYSTEM AND METHOD FOR GENERATING REALISTIC SIMULATION DATA FOR TRAINING AN AUTONOMOUS DRIVER

RELATED APPLICATIONS

This application is a continuation of U.S. patent application Ser. No. 17/286,526 filed on Apr. 19, 2021 which claims the benefit of priority of PCT Patent Application No. PCT/IL2019/051119 having International Filing Date of Oct. 15, 2019, which claims the benefit of priority under 35 USC § 119(e) of U.S. Provisional Patent Application No. 62/746,607 filed on Oct. 17, 2018. The contents of the above applications are all incorporated by reference as if fully set forth herein in their entirety.

FIELD AND BACKGROUND OF THE INVENTION

The present invention, in some embodiments thereof, relates to creating a simulated model of a geographical area, and, more specifically, but not exclusively, to creating a simulated model of a geographical area, optionally including vehicle traffic to generate simulation sensory data for training an autonomous driving system.

When generating simulated data for training an autonomous driving system there is a need to generate data that exhibits realistic behavior and a realistic look (for example for visual sensors).

For a simulated environment that exhibits realistic behavior for training autonomous driving there is a need to simulate agents representing other moving objects. Each of these moving objects is a vehicle or a pedestrian with a driver following some driving pattern that governs the moving object's behavior in the simulation (for example: a reckless driver tends to keep shorter distances from a vehicle in front than a sedate driver does). Training an autonomous driving system may comprise providing the autonomous driving system simulation sensory data comprising the agents representing other moving objects and analyzing the autonomous driving system's actions in response to the simulation sensory data.

In some systems for training an autonomous driving system the simulation sensory data comprises a plurality of images. A video is a sequence of images, that is a plurality of images arranged in a sequence. A photo-realistic synthetic image is an image that looks as though it were photographed by a camera. A rendering engine can generate a synthetic image according to semantic descriptions of the required image. However, many images generated by a rendering engine do not appear photo-realistic. Some characteristics that cause an image to appear non-realistic are: color saturation in some areas of the image; gradients (or lack thereof) in the color of the sky, a road, or any other surface in the image; and lighting and shading. There is a need to generate photo-realistic looking synthetic environments for a variety of applications. Training a machine learning model of an autonomous driving system is one example where there is a need for a photo-realistic synthetic environment. Other examples are video games, computer generated animation movies, and computer enhanced movies. A possible way to generate realistic looking images is to use an image refining model to refine synthetic images generated by a simulation generation model (referred to above as a rendering engine).

SUMMARY OF THE INVENTION

It is an object of the present invention to provide a system and a method for generating simulation data and more specifically, but not exclusively, generating simulation data for the purpose of training an autonomous driving system.

The foregoing and other objects are achieved by the features of the independent claims. Further implementation forms are apparent from the dependent claims, the description and the figures.

According to a first aspect of the invention, a method for training a model for generating simulation data for training an autonomous driving agent comprises: analyzing real input data, collected from a driving environment, to identify a plurality of environment classes, a plurality of moving agent classes, and a plurality of movement pattern classes; generating a training environment, according to one environment class of the plurality of environment classes; and in at least one of a plurality of training iterations: generating, by a simulation generation model, a simulated driving environment according to the training environment and according to a plurality of generated training agents, each associated with one of the plurality of moving agent classes and one of the plurality of movement pattern classes; collecting simulated driving data from the simulated driving environment; and modifying at least one model parameter of the simulation generation model to minimize a difference between a simulation statistical fingerprint, computed using the simulated driving data, and a real statistical fingerprint, computed using the real input data.

According to a second aspect of the invention, a system for training a model for generating simulation data for training an autonomous driving agent comprises at least one hardware processor adapted to: analyzing real input data, collected from a driving environment, to identify a plurality of environment classes, a plurality of moving agent classes, and a plurality of movement pattern classes; generating a training environment, according to one environment class of the plurality of environment classes; in each of a plurality of training iterations: generating, by a simulation generation model, a simulated driving environment according to a plurality of generated training agents, each associated with one of the plurality of moving agent classes and one of the plurality of movement pattern classes; collecting simulated driving data from the simulated driving environment; and modifying a plurality of model parameters of the simulation generation model to minimize a difference between a simulation statistical fingerprint, computed using the simulated driving data, and a real statistical fingerprint, computed using the real input data.

According to a third aspect of the invention, a method for creating data for training an autonomous driving agent comprises: accessing a simulation generation model trained by: analyzing real input data, collected from a driving environment, to identify a plurality of environment classes, a plurality of moving agent classes, and a plurality of movement pattern classes; generating a training environment, according to one environment class of the plurality of environment classes; in each of a plurality of training iterations: generating, by the simulation generation model, a simulated training driving environment according to the training environment and according to a plurality of generated training agents, each associated with one of the plurality of moving agent classes and one of the plurality of movement pattern classes; collecting simulated driving data from the simulated training driving environment; and modifying a plurality of model parameters of the simulation generation model to minimize a difference between a simulation statistical fingerprint, computed using the simulated driving data, and a real statistical fingerprint, computed using the real input data; receiving a new environment class of the plurality of environment classes; and instructing at least one other hardware processor to: generate a simulated environment, according to the new environment class; generate a plurality of simulated agents, each associated with one of another plurality of moving agent classes and another plurality of movement pattern classes; and generate a simulated driving environment by the simulation generation model according to the simulation environment and the plurality of simulated agents.

According to a fourth aspect of the invention, A method for training an image refining model for generating simulation data for training an autonomous driving agent, comprising: for each of a plurality of image refining models, training the image refining model to generate a refined image in response to input comprising a synthetic image; computing a plurality of model scores by computing for each of the plurality of image refining models a model score indicative of a quality of realism of the respective refined image generated by the respective image refining model in response to input comprising the synthetic image, and indicative of a quality of content preservation of the respective refined image with reference to the synthetic image; and selecting an image refining model of the plurality of image refining models having a preferred model score of the plurality of model scores.

According to a fifth aspect of the invention, a system for training an image refining model for generating simulation data for training an autonomous driving agent comprises at least one hardware processor adapted to: for each of a plurality of image refining models, training the image refining model to generate a refined image in response to input comprising a synthetic image; computing a plurality of model scores by computing for each of the plurality of image refining models a model score indicative of a quality of realism of the respective refined image generated by the respective image refining model in response to input comprising the synthetic image, and indicative of a quality of content preservation of the respective refined image with reference to the synthetic image; and selecting an image refining model of the plurality of image refining models having a preferred model score of the plurality of model scores.

According to a sixth aspect of the invention, a method for generating simulation data for training an autonomous driving agent comprises: accessing an image refining model trained by: for each of a plurality of image refining models, training the image refining model to generate a refined image in response to input comprising a synthetic image; computing a plurality of model scores by computing for each of the plurality of image refining models a model score indicative of a quality of realism of the respective refined image generated by the respective image refining model in response to input comprising the synthetic image, and indicative of a quality of content preservation of the respective refined image with reference to the synthetic image; and selecting a computer generated model of the plurality of computer generated models having a preferred model score of the plurality of model scores; and instructing at least one hardware processor to generate by the image refining model at least one refined output image in response to at least one input synthetic image, received via an input interface from an environment generation engine.

With reference to the first and second aspects, in a first possible implementation of the first and second aspects of the present invention the real input data comprises environment data and agent data; the environment data comprises a plurality of environment values of a plurality of environment attributes describing the driving environment; and the agent data comprises for each of a plurality of agents operating in the driving environment a plurality of agent values of a plurality of agent attributes, each plurality of agent values describing an appearance of the respective agent and a behavior in the driving environment of the respective agent. Describing the driving environment using a plurality of environment values of a plurality of environment attributes and describing an appearance of an agent and a behavior of the agent in the driving environment using a plurality of agent values of a plurality of agent attributes facilitates generating one or more simulated agents realistically representing one or more agents detected in the real input data, increasing accuracy of an output of a model trained using the one or more simulated agents, thus increasing accuracy of an autonomous driving agent trained using the output of the model trained using the one or more simulated agents. Optionally, at least one of the plurality of environment values is selected from a group of environment values consisting of: a time of day value, a day of week value, a month of year value, a temperature value, an air clarity metric value, a precipitation value, a precipitation type value, a wind velocity value, a wind direction value, an amount of light value, an artificial light indication value, a crowd density metric value, an incline value, a curve direction value, a curve radius value, and a road horizontal angle value. Optionally, at least one of the plurality of agent values is selected from a group of agent values consisting of: a height value, a width value, a longitudinal velocity value, a lateral velocity value, a longitudinal acceleration value, a lateral acceleration value, a longitudinal distance value, a lateral distance value, a longitudinal direction value, a lateral direction value, a traffic rule violation indication value, an opposite lane indication value, a shoulder indication value, a collision indication value, an amount of passes of other agents, a transition time value, a transition delay time value, an outbound transition angle value, and an inbound transition angle value. Optionally, each of the plurality of environment classes comprises at least some of the plurality of environment values. Optionally, each of the plurality of moving agent classes describes a moving agent selected from a group of possible moving agents consisting of: a car, a truck, a motorized vehicle, a train, a boat, an air-born vehicle, a waterborne vessel, a motorized scooter, a scooter, a bicycle, and a pedestrian; and each of the plurality of moving agent classes comprises a plurality of agent probabilities, each agent probability indicative of a likelihood of a moving agent associated with the respective moving agent class to demonstrate an agent behavior described by an identified plurality of agent values of the plurality of agent values when the driving environment is described by a first environment class of the plurality of environment classes. Using a plurality of agent probabilities facilitates simulating realistic behavior of one or more simulated agents, increasing accuracy of an output of a model trained using the one or more simulated agents, thus increasing accuracy of an autonomous driving agent trained using the output of the model trained using the one or more simulated agents. Optionally, each of the plurality of movement pattern classes describes an actor selected from a group of possible actors consisting of: a pedestrian, a bicycle rider, a vehicle driver; and each of the plurality of movement pattern classes comprises a plurality of actor probabilities, each actor probability indicative of a likelihood of an actor associated with the respective movement pattern class to demonstrate an actor behavior described by an identified movement pattern plurality of agent values of the plurality of agent values when the driving environment is described by a second environment class of the plurality of environment classes. Using a plurality of movement pattern probabilities facilitates simulating realistic behavior of one or more simulated agents, increasing accuracy of an output of a model trained using the one or more simulated agents, thus increasing accuracy of an autonomous driving agent trained using the output of the model trained using the one or more simulated agents.

With reference to the first and second aspects, in a second possible implementation of the first and second aspects of the present invention analyzing the real input data comprises applying a transformation to the plurality of agent values. Applying a transformation to the real input data allows aligning one or more signals captured by one or more sensors, thus increasing accuracy of the plurality of environment classes, the plurality of moving agent classes, and the plurality of movement classes, and therefore increasing accuracy of the simulated driving environment generated according to the plurality of moving agent classes, the plurality of movement classes, and one of the plurality of environment classes. Increasing accuracy of the simulated driving environment increases accuracy of an output of a model trained using the simulated driving environment and thus increases accuracy of an autonomous driving agent trained using the output of the model.

With reference to the first and second aspects, in a third possible implementation of the first and second aspects of the present invention the real statistical fingerprint is computed using the plurality of environment values and the plurality of agent values. Optionally, the simulated driving data comprises simulated environment data and simulated agent data. Optionally, the simulated environment data comprises a plurality of simulated environment values of the plurality of environment attributes describing the simulated driving environment; the simulated agent data comprises for each of the plurality of generated training agents a plurality of simulated agent values of the plurality of agent attributes, each plurality of simulated agent values describing an appearance of the respective generated training agent and a behavior in the simulated driving environment of the respective generated training agent; and the simulation statistical fingerprint is computed using the plurality of simulation environment attribute values and the plurality of simulation agent values. Computing a real statistical fingerprint using the plurality of environment values and the plurality of agent values and computing a simulation statistical fingerprint using the plurality of simulation environment attribute values and the plurality of simulation agent values increases accuracy of a comparison between a simulated driving environment and a real driving environment, thus reduces an amount of time required to train a model for generating simulation data, reducing cost of development of the model. In addition, using such simulation statistical fingerprint and real statistical fingerprint increases accuracy of an output of a model trained using the simulated driving environment.

With reference to the first and second aspects, in a fourth possible implementation of the first and second aspects of the present invention at least some of the plurality of environment classes, the plurality of moving agent classes and the plurality of movement pattern classes are identified using at least one machine learning model to analyze the real input data. Optionally, at least some of the plurality of environment classes, the plurality of moving agent classes and the plurality of movement pattern classes are identified by applying at least one statistical analysis method to the real input data. Optionally, the real input data further comprises at least one label indicative of one or more environmental conditions when at least some of the real input data is collected from the driving environment, and analyzing the real input data comprises using at least some of the at least one label.

With reference to the first and second aspects, in a fifth possible implementation of the first and second aspects of the present invention generating the simulated driving environment according to the plurality of generated training agents comprises: associating each of the plurality of generated training agents a moving agent class of the plurality of moving agent classes and a movement pattern class of the plurality of movement classes; and generating for each of the plurality of generated training agents simulated behavior data in accordance with: 1) the plurality of agent probabilities of the respective moving agent class according to the one environment class, and 2) the plurality of actor probabilities of the respective movement pattern class according to the one environment class. Optionally, generating the simulated driving environment further comprises computing a probability score for each of the plurality of moving agent classes and each of the plurality of movement pattern classes. Optionally, a moving agent class of the plurality of moving agent classes is associated with a generated training agent according to the respective probability score; and a movement pattern class of the plurality of movement pattern classes is associated with a generated training agent according to the respective probability score. Optionally, generating the simulated driving environment further comprises: identifying in the plurality of moving agent classes at least one less probable moving agent classes according to the respective probability score; and associating at least one of the generated training agents with one of the at least one less probable moving agent classes according to an agent probability higher than an initial agent probability in accordance with the respective probability score. Generating at least one training agent associated with a less probable moving agent class allows ensuring an autonomous driving agent trained with the simulation environment encounters behavior described by the less probable moving agent class more frequently than realistic driving conditions dictate, thus increasing accuracy of an output of the autonomous driving agent. Optionally, generating the simulated driving environment further comprises: identifying in the plurality of movement pattern classes at least one less probable movement pattern classes according to the respective probability score; and associating at least one of the generated training agents with one of the at least one less probable movement pattern classes according to an actor probability higher than an initial actor probability in accordance with the respective probability score. Generating at least one training agent associated with a less probable movement pattern class allows ensuring an autonomous driving agent trained with the simulation environment encounters behavior described by the less probable movement pattern class more frequently than realistic driving conditions dictate, thus increasing accuracy of an output of the autonomous driving agent.

With reference to the first and second aspects, in a sixth possible implementation of the first and second aspects of the present invention training the model further comprises generating another training environment, according to another environment class of the plurality of environment classes; and in each of a plurality of additional training iterations: generating, by another simulation generation model, another simulated driving environment according to the other training environment and according to a plurality of other generated training agents, each associated with one of the plurality of moving agent classes and one of the plurality of movement pattern classes; collecting other simulated driving data from the other simulated driving environment; and modifying a plurality of other model parameters of the other simulation generation model to minimize another difference between another simulation statistical fingerprint, computed using the other simulated driving data, and the real statistical fingerprint, computed using the real input data. Using the plurality of environment classes, the plurality of moving agent classes and the plurality of movement pattern classes identified in the real input data to generate more than one training environment reduces cost of development of the model.

With reference to the first and second aspects, in a seventh possible implementation of the first and second aspects of the present invention the real input data comprises real data collected by at least one sensor selected from a group of sensors comprising: a camera, an electromagnetic radiation sensor, a radar, a Light Detection and Ranging (LIDAR) sensor, a microphone, a thermometer, an accelerometer, and a video camera.

With reference to the first and second aspects, in an eighth possible implementation of the first and second aspects of the present invention the at least one hardware processor is further adapted to output the simulation generation model to a non-volatile digital storage connected to the at least one hardware processor. Optionally, the at least one hardware processor is further adapted to receiving the real input data via at least one digital communication network interface connected to the at least one hardware processor. Optionally, the at least one hardware processor is further adapted to output the simulation generation model via the at least one digital communication network interface. Outputting the simulation generation model via the at least one digital communication network interface facilitates using the simulation generation model in more than one simulation generation systems, reducing cost of implementation of a simulation generation system using the simulation generation model.

With reference to the fourth and fifth aspects, in a first possible implementation of the fourth and fifth aspects of the present invention the model score is computed by: producing a plurality of refined output images, each generated by the respective image refining model in response to input comprising one of a plurality of test images; computing a plurality of image self-distance scores, each indicative of a quality of content preservation in one of the plurality of refined output images with reference to the respective test image; computing a plurality of realism scores, each indicative of a quality of realism of one of the plurality of refined output images; computing a plurality of image quality scores each indicative of an image quality of one of the plurality of refined output images; computing a task-oriented score by: computing a training score of a first classifier model, trained using the plurality of refined output images, indicative of a success rate of the first classifier model classifying a plurality of real images; and computing a testing score of a second classifier model, trained using the plurality of real images, indicative of a success rate of the second classifier model classifying the plurality of refined output images; and computing the model score using the plurality of image self-distance scores, the plurality of feature scores, the plurality of image quality scores and the task-oriented score. Optionally, computing the model score comprises computing at least one term selected from a group of terms consisting of: an average of the plurality of image self-distance scores, a standard deviation of the plurality of image self-distance scores, a sum of the plurality of image self-distance scores, an average of the plurality of realism scores, a standard deviation of the plurality of realism scores, a sum of the plurality of realism scores, an average of the plurality of image quality scores, a standard deviation of the plurality of image quality scores, and a sum of the plurality of image quality scores. Optionally, computing the plurality of realism scores comprises computing a plurality of feature scores, each indicative of a distance between: 1) a plurality of refined features in one of the plurality of refined output images, and 2) a plurality of features extracted from a target real image equivalent to the respective test image. Optionally, at least one of the plurality of feature scores is a Frechet Inception Distance (FID). Optionally, computing the plurality of realism scores comprises computing a plurality of reconstructions scores, each indicative of a difference between a refined image of the plurality of refined output images and a reconstructed image, reconstructed from a corrupted refined image by a reconstruction model trained to reconstruct real images. Computing the model score using the plurality of image self-distance scores, the plurality of feature scores, the plurality of image quality scores and the task-oriented score allows the model score to reflect one or more metrics of model quality, and in addition allows adjusting how the one or more metrics are reflected in the model score, increasing accuracy of the model score with respect to an identified goal, thus increasing accuracy of an output of the image refining model.

With reference to the fourth and fifth aspects, or the first implementation of the fourth and fifth aspects, in a second possible implementation of the fourth and fifth aspects of the present invention each of the plurality of image-quality scores is normalized in a range from 0 to 1. Optionally, each of the plurality of realism scores is normalized in a range from 0 to 1. Optionally, each of the plurality of image self-distance scores is normalized in a range from 0 to 1. Normalizing one or more of the scores used to compute the model score facilitates applying one or weights when computing the model score, increasing accuracy of the model score.

With reference to the fourth and fifth aspects, or the first implementation of the fourth and fifth aspects, in a third possible implementation of the fourth and fifth aspects of the present invention the first semantic classifier is a first semantic segmentation classifier; and the training score is a first F1 score indicative of a first percentage of pixels of each of the plurality of refined output images classified correctly by the first classifier. Optionally, the second classifier is a second semantic segmentation classifier; and the testing score is a second F1 score indicative of a second percentage of pixels of each of the plurality of real images classified correctly by the second classifier.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
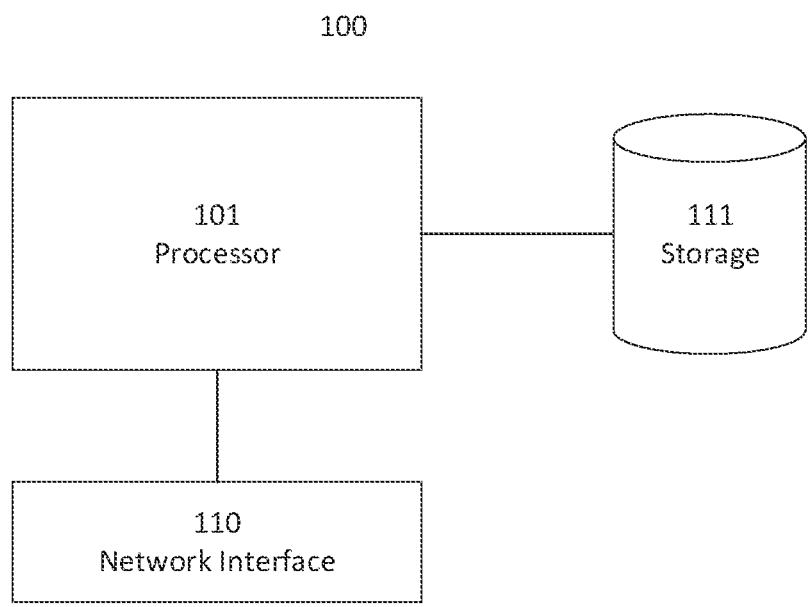
FIG. 1 is a schematic block diagram of an exemplary system for training a model for generating simulation data, according to some embodiments of the present invention.

The present invention, in some embodiments thereof, relates to creating a simulated model of a geographical area, and, more specifically, but not exclusively, to creating a simulated model of a geographical area, optionally including vehicle traffic to generate simulation sensory data for training an autonomous driving system.

For brevity, henceforth the term "agent" is used to mean "simulated agent" and the terms are used interchangeably. In addition, for brevity the term "autonomous driver" is used to mean "autonomous driving system" and the terms are used interchangeably.

In the field of generating simulation environments for training and testing it is common to use random values to simulate real world situations. Thus, some systems for generating simulation data for training an autonomous driving system generate agents that simulate random movement patterns of a moving object. One possible way to generate a random movement pattern for a simulated agent is by generating random movement characteristics of the simulated agent. Some examples of an agent's movement characteristics are: a forward velocity, a forward acceleration, a lateral velocity, and a lateral acceleration. Some movement characteristics of the agent pertain to distances, for example a distance from a lane boundary, and a distance from another moving object moving in front of the moving object represented by the agent. Some movement characteristics of the agent pertain to passing other moving objects, for example a distance from another object in front of the moving object, a distance from another object on a side of the moving object, an angle of a transition out of a lane, and an angle of a transition in to an original lane. Some movement characteristics of the agent pertain to lane transitions, for example an angle of a lane transition, a direction of a lane transition, and a distance from another object when transitioning between two or more lanes. Some movement characteristics of the agent pertain to pedestrian movement, for example an amount of time between a pedestrian stopping and the pedestrian transitioning from a sidewalk to a street. Some movement characteristics of the agent pertain to collisions, for example an angle of a collision, a location of impact on a vehicle, and location of impact on a pedestrian. Some movement characteristics of the agent pertain to traffic rules, for example a vehicle or pedestrian moving through a red light, a vehicle moving in a lane in a direction opposite to the lane's direction, and a vehicle moving on a shoulder of a road. Some movement characteristics are indicative of where a pedestrian crosses a road, for example at a designated crosswalk, at a street corner, and in the middle of a straight stretch of road.

Another possible way to generate a random movement pattern for a simulated agent is by randomly generating the simulated agent's behavior at every point of the simulation. However, there is a need to produce agents that simulate realistic driving patterns and not just random driving patterns.

Instead of randomly generating driving characteristics of a simulated agent, or randomly generating a simulated agent's behavior at every point of a simulation, the present invention, in some embodiments thereof, proposes learning realistic moving object characteristics and realistic movement patterns from real traffic data collected from real traffic environments. In such embodiments the present invention further proposes generating one or more simulated agents according to the learned moving object characteristics and realistic movement patterns, such that each simulated agent embodies a realistic type of moving object (that is, vehicle or pedestrian) and a realistic type of movement pattern in a realistic traffic environment. Optionally, a simulation generation model generates a simulated driving environment using the one or more simulated agents. The simulated driving environment may be used to train an autonomous driving system. Additionally, or alternatively, the simulated driving environment may be used to test an autonomous driving system. Generating the simulated agents according to the learned moving object characteristics and realistic movement patterns increases accuracy of the simulation driving environment generated using the simulated agents and adds valuable simulated cases, and thus increases accuracy of an output of a system trained using the simulation driving environment, for example an autonomous driving system.

In computing, a statistical fingerprint of identified data is a statistical value computed using the identified data that uniquely identifies the identified data for practical comparison purposes. The present invention additionally proposes in some embodiments thereof classifying the realism of the simulated driving environment using a difference between a simulation statistical fingerprint computed using simulated driving data collected from a simulated driving, and a real statistical fingerprint computed using the real traffic data. An understanding of a world may be based on statistics collected about the world. In simulating agents representing moving objects, some statistics are of the nature of "how probable is it that a vehicle of type X driven by a driver of type Y will do Z in driving environment W", for example "how probable is it that a vehicle of type X driven by a teenager will cut a lane at angle α at night". Thus, according to some embodiments of the present invention, the real traffic data is analyzed to identify a plurality of environment classes, a plurality of moving agent classes and a plurality of movement pattern classes. Each of the environment classes describes a driving environment, and optionally comprises one or more environment values of a plurality of environment attributes describing the driving environment. Some examples of an environment attribute are a time of day, a time of week, and a month of year. Some environment attributes pertain to weather conditions, for example a temperature, an amount of fog, an air clarity metric, for example an amount of fog or an amount of smog, an amount of precipitation, a wind velocity and a wind direction. Some environment attributes pertain to environment conditions, for example amount of daylight, amount of clouds, type of clouds, artificial light, and an amount of vehicles per an identified amount of time. Some environment attributes pertain to geography, for example an incline, a direction of a curve, a radius of a curve a horizontal angle of a road, a body of water, and a geographical environment type such as a building site, a forest, an urban area, a sub-urban area, a military area, and an open field. Each of the plurality of moving agent classes describes a moving agent simulating a moving object, and optionally comprises one or more agent probabilities, each indicative of a likelihood of a moving agent associated with the respective moving agent class to demonstrate an identified agent behavior in an identified driving environment. The identified agent behavior is optionally described by an identified plurality of agent values of the plurality of agent attributes. The driving environment is optionally described by an identified environment class of the plurality of environment classes. Optionally, each of the plurality of moving agent classes comprises one or more agent values each of one of a plurality of agent attributes. Some examples of an agent attribute are height, width, and weight. Optionally, some of plurality of agent attributes are agent movement characteristics, for example as described above. Each of the plurality of movement pattern classes describes an actor. Some examples of an actor are a pedestrian, a bicycle driver, and a vehicle driver. Optionally each of the plurality of movement pattern classes comprises a plurality of actor probabilities, each indicative of a likelihood of an actor associated with the respective movement pattern class to demonstrate an identified actor behavior in another identified driving environment. The identified actor behavior is optionally described by an identified movement pattern plurality of agent values of the plurality of agent attributes. Optionally, the other identified driving environment is described by another identified environment class of the plurality of environment classes.

Optionally, the plurality of environment classes, the plurality of moving agent classes and the plurality of movement classes are used to generate the simulated driving environment. Optionally, the driving environment is generated according to one of the plurality of environment classes. Optionally, the simulated driving environment is generated according to one or more simulated agents, each associated with one of the plurality of moving agent classes and one of the plurality of movement pattern classes. Optionally the simulated driving environment is generated according to the respective plurality of agent probabilities and the respective plurality of actor probabilities of each of the one or more simulated agents.

In some embodiments the present invention proposes training the simulation generation model using the difference between the simulation statistical fingerprint and the real statistical fingerprint. Optionally the real statistical fingerprint is computed using the plurality of environment values and the plurality of agent values. Optionally, the simulated driving data comprises one or more simulated environment values of the plurality of environment attributes describing the simulated driving environment. Optionally, the simulated driving data comprises for each of the plurality of generated agents a plurality of simulated agent values of the plurality of agent attributes. Optionally, the simulation statistical fingerprint is computed using the plurality of simulated environment values and the plurality of simulated agent values. Optionally, in at least one of a plurality of training iterations at least one model parameter of the simulation generation model is modified to minimize a difference between the simulation statistical fingerprint and the real statistical fingerprint. Using the difference between the simulation statistical fingerprint and the real statistical fingerprint to train the simulation generation model increases the accuracy of an output of the simulation generation model, thus increasing accuracy of a system trained using the output of the simulation generation model, for example an autonomous driving system. Computing a statistical fingerprint according to a plurality of environment values and a plurality of agent values increases accuracy of the statistical fingerprint as an encapsulation of an environment's characteristics, thus increasing accuracy of an output of a simulation generation model trained using one or more statistical fingerprints each computed according to a plurality of environment values and a plurality of agent values.

In addition, the present invention proposes training more than one simulation generation model, each trained according to one of the plurality of environment classes, and training an autonomous driving system using output generated by the more than one simulation generation model. Training the autonomous driving system using more than one simulated driving environment, each generated by one of the more than one simulation generation models increases the accuracy of an output of the autonomous driving system, allowing the autonomous driving system to drive correctly in more than one environment.

To generate the simulated driving environment according to the one or more simulated agents, the present invention further proposes, in some embodiments thereof, computing for each of the plurality of moving agent classes and each of the plurality of movement pattern classes a probability score, each indicative of a probability that the simulated driving environment, characterized by the environment class, comprises a moving agent associated with the respective moving agent class and additionally or alternatively with the respective movement pattern class. For example, during school hours (such as some hours of the morning), a movement pattern characteristic of an adolescent may be less likely than during the afternoon and early evening. In another example, during rush hours there may be a higher probability for a car to exist in a driving environment than in the middle of the night. In some embodiments of the present invention, when simulating an amount of agents, assignment of an agent to a moving agent class is according to a probability the moving agent class appears in the simulated driving environment according to the environment class. Optionally, assignment of an agent to a movement pattern class is according to a probability the movement pattern class appears in the simulated driving environment according to the environment class.

Training an autonomous driver may require special attention to edge cases—reckless drivers cutting lanes, inattentive pedestrians stepping off the sidewalk and crossing in the middle of the road instead of at a cross walk, particularly slow drivers blocking traffic etc. To train an autonomous driver it may be desirable to assign an agent to a less probable moving agent class or movement pattern class, in order to expose the autonomous driver to such relatively rare conditions. Thus, according to some embodiments of the present invention an agent is assigned a movement pattern class at a higher probability than the movement pattern class's probability. Optionally the agent is assigned a moving agent class at a higher probability than the moving agent class's probability. For example, when the probability of a very slow pedestrian (for example an older pedestrian) in rainy conditions is low, for example 1%, the probability of generating an agent associated with a very slow pedestrian may be increased to higher value, for example 25%, to ensure the autonomous driver encounters such behavior more frequently than realistic conditions dictate, thus increasing accuracy of an output of the autonomous driver in rare driving conditions.

As described above, an image refining model (a refiner) may be used to refine synthetic images generated by a simulation generation model, for example a simulated driving environment, to increase realism of the synthetic images.

Some methods for training an image refining model comprise using various metrics to evaluate an output of the refiner and attempt to improve a value of the refiner evaluation metric. Output of one trained refiner may have significantly different quality than output of another trained refiner. It may be that training an identified refiner does not converge to a desired equilibrium. Investing in improving such a refiner could consume processing resources and time without yielding any benefit. Identifying such a refiner a-priori is currently not possible.

Instead of improving one image refining model, the present invention, in some embodiments thereof, additionally proposes training a plurality of image refining models, computing for each a model score indicative of how good the output images of the respective model are, and using an image refining model with a preferred model score to generate realistic simulation data for training an autonomous driver.

There is a need to train an image refining model to produce an output image that is similar to an input synthetic image in its content and similar to a target real environment in its appearance, or style. Existing methods for training an image refining model cannot achieve best similarity in contents and best similarity to the target real environment simultaneously. The present invention, in some embodiments thereof, further proposes evaluating output of an image refining model using a model score reflecting one or more qualities of the output images: how realistic the images are and how well they preserve the contents of the input synthetic images. In addition, the score optionally reflects how good the images are according to one or more image quality metrics (blur, noise, distortion, artifacts etc.). In addition, the model score optionally reflects a task oriented score of the image refining model, indicative of how well images produced by the image refiner model can pass as real images with a classifier model trained to classify digital images. Optionally, computing the task oriented score comprises training a classifier using a set of refined output images generated by the image refining model, and optionally computing a score according to the classifier's success at classifying as real a set of real target images (the higher the better). Successfully classifying a set of real target images by a classifier trained using a set of refined output images generated by the image refining model is indicative of an accuracy of an output of the image refining model. Optionally, computing the task oriented score comprises training another classifier using the set of real target images and optionally computing another score according to the other classifier's success at classifying the set of refined output images as real (the higher the better). Successfully classifying a set of refined output images generated by the image refining model by a classifier trained using a set of real target images is indicative of an accuracy of an output of the image refining model. Computing a model score using the task oriented score increases accuracy of the model score, and thus increases accuracy of realistic simulation data generated using an image refining model selected according to the preferred model score.

As there is a tradeoff between one or more qualities of the output images, the model score is optionally computed using a combination of the one or more qualities of the output images, reflecting an identified tradeoff between the one or more qualities, thus increasing the accuracy of the realistic simulation data generated using the image refining model selected according to the preferred model score.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, the term processing unit refers to one or more processors of a system executing code. Some examples of a processor of a system are a virtual machine, a server, a desktop computer and a hardware controller. Henceforth, the term hardware processor is used interchangeably with the term processing unit, meaning one or more processors of a system executing a code.

In addition, for brevity the term "network interface" is used to mean at least one digital communication network interface.

Henceforth the term simulation generation model is used to mean a model for generating simulation data, and the terms are used interchangeably.

Reference is now made to FIG. 1, showing a schematic block diagram of an exemplary system 100 for training a model for generating simulation data, according to some embodiments of the present invention. In such embodiments, processing unit 101 is connected to at least one non-volatile digital storage 111. Some examples of a non-volatile digital storage are a hard disk drive, a solid state memory component, and a network connected storage. Optionally, processing unit 101 outputs a trained simulation generation model to at least one non-volatile digital storage 111. Optionally, processing unit 101 retrieves real input data, collected from a driving environment, from at least one non-volatile digital storage 111. Optionally, processing unit 101 is connected to network interface 110. Optionally, processing unit 101 receives the real input data from a database or a network connected source via network interface 110. Optionally, processing unit 101 outputs the trained simulation generation model via network interface 110, for example by sending the trained simulation generation model to another processing unit. Optionally, network interface 110 is connected to a local area network, for example and Ethernet network or a wireless network. Optionally, network interface 110 is connected to a wide area network, for example the Internet.

To train a model for generating simulation data, system 100 implements in some embodiments of the present invention the following optional method.

Figure 2:
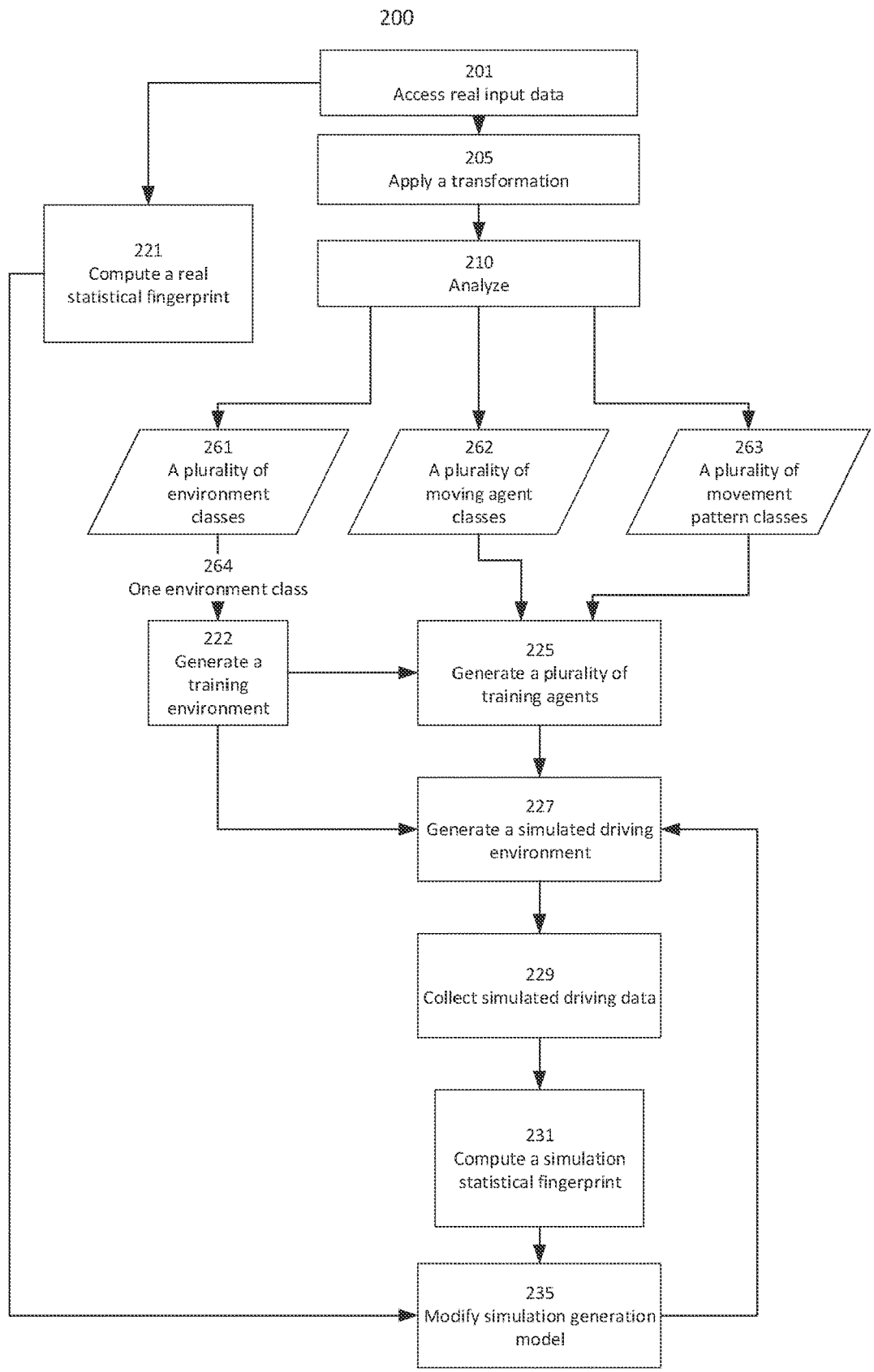
FIG. 2 is a flowchart schematically representing an optional flow of operations for training a model for generating simulation data, according to some embodiments of the present invention.

Reference is now made also to FIG. 2, showing a flowchart schematically representing an optional flow of operations 200 for training a model for generating simulation data, according to some embodiments of the present invention. In such embodiments, in 201 processing unit 101 accesses real input data, collected from a driving environment. Optionally, processing unit 101 retrieves the real input data from at least one non-volatile digital storage 111. Optionally, processing unit 101 receives the real input data via network interface 110. Optionally, the real input data comprises real data collected by one or more sensors. Some examples of a sensor are a camera, an electromagnetic radiation sensor, a radar, a Light Detection and Ranging (LIDAR) sensor, a microphone, a thermometer, an accelerometer and a video camera. Optionally, the real data is collected by one or more sensors mounted on one or more vehicles, optionally while the vehicle traverses one or more driving environments. Optionally, the real input data comprises environment data, describing the one or more driving environments. Optionally, the environment data comprises a plurality of environment values of a plurality of environment attributes describing the driving environment. Some examples of an environment value are a time of day value, a time of week value, and a month of year value. Some other examples of an environment value are a temperature value, an amount of fog, an air clarity metric value, for example an amount of fog or an amount of smog, a precipitation value, for example an amount of precipitation or a precipitation rate value, a precipitation type value, a wind velocity value, a wind direction value, an amount of light value, an artificial light indication value, a characteristic of artificial light such as a color value or an intensity value, a crowd density metric value, an incline value, a curve direction value, a curve radius value, and a road horizontal angle value. Optionally, the real input data comprises one or more labels, indicative of one or more environmental conditions when capturing at least some of the data from the driving environment, for example a geographical location of the driving environment or a time of day of the driving environment. Optionally, the real input data comprises agent data, describing one or more agents operating in at least one of the one or more driving environments. Optionally, the agent data describes, for each of the one or more agents, one or more structural features of a vehicle or a pedestrian, and additionally or alternatively one or more behavior characteristics of a vehicle of a pedestrian. Some examples of a vehicle are a car, a truck, and a bicycle. The vehicle may be a motorized vehicle other than a car and a truck. The vehicle may be an air-borne vehicle, for example an airplane or a drone. The vehicle may be a waterborne vessel, for example a boat, a raft, and a personal watercraft such as a water scooter. A pedestrian may be a human pedestrian. A pedestrian may be an animal, such as a dog or a horse. Optionally, the agent data comprises for each of the one or more agents a plurality of agent attributes describing an appearance of the respective agent and a behavior in the driving environment of the respective agent. Some examples of an agent value are a height value and a width value. Some other examples of an agent value are: a longitudinal velocity value, a lateral velocity value, a longitudinal acceleration value, a lateral acceleration value, a longitudinal distance value, a lateral distance value, a longitudinal direction value, a lateral direction value, a traffic rule violation indication value, an opposite lane indication value, a shoulder indication value, a collision indication value, an amount of passes of other agents, a transition time value, a transition delay time value, an outbound transition angle value, and an inbound transition angle value.

In 205, processing unit 101 optionally applies to the real input data a transformation according to a lane, to produce transformed input data. Optionally, the transformation according to a lane provides a perspective view relative to the lane. Optionally, the transformation according to a lane provides a birds-eye view of the lane. Optionally, the transformed input data comprises the one or more labels of the real input data.

In 210, processing unit 101 optionally analyzes the transformed input data to identify plurality of environment classes 261, each describing a driving environment, plurality of moving agent classes 262, each describing a moving agent simulating a moving object, and plurality of movement pattern classes 263, each describing an actor. Optionally, each of plurality of environment classes 261 comprises at least some of the plurality of environment values, optionally transformed in 205 by the transformation. Optionally, an environment class of the plurality of environment classes describes environmental noise of an identified geographical location, for example San Francisco, Denver or New Delhi. Some examples of environmental noise are an air clarity metric value, an amount of vegetation, a type of vegetation, an amount of buildings, a density of buildings, a type of buildings, and a light characteristic value. Some examples of a moving agent are a car, a truck, a motorized vehicle, a train, a boat, an air-born vehicle, a waterborne vessel, a motorized scooter, a scooter, a bicycle and a pedestrian. Some examples of an actor are a pedestrian, a bicycle rider and a vehicle driver. Optionally, each of the plurality of moving agent classes comprises a plurality of agent probabilities. Optionally, each agent probability is indicative of a likelihood of a moving agent associated with the respective moving agent class to demonstrate an agent behavior described by an identified plurality of agent values of the plurality of agent values when a driving environment is described by a first environment class of the plurality of environment classes. For example, an agent class may have a likelihood of a velocity value exceeding 100 miles per hour lower when the first environment class describes a driving environment having fog, than when the first environment class describes a driving environment having no fog. Optionally, each of the plurality of movement pattern classes comprises a plurality of actor probabilities. Optionally, each actor probability is indicative of a likelihood of an actor associated with the respective movement pattern class to demonstrate an actor behavior described by an identified movement pattern plurality of agent values of the plurality of agent values when a driving environment is described by a second environment class of the plurality of environment classes. For example, a movement pattern class may have a likelihood of not stopping before stepping from a curb to the road lower when an actor associated with the second agent class has a height value exceeding 165 centimeters (possibly an adult) than when the actor has a height value less than 130 centimeters (possibly a child). Optionally, one or more of plurality of environment classes 261 and additionally or alternatively one or more of plurality of moving agent classes 262 and further additionally and alternatively one or more of plurality of movement pattern classes 263 are identified according to at least some of the real input data collected by more than one sensor, optionally using one or more sensor fusion methods.

Optionally, in 210 processing unit 101 analyzes the transformed input data using at least one machine learning model, and optionally identifies at least some of plurality of environment classes 261, plurality of moving agent classes 262 and plurality of movement pattern classes 263 using the at least one machine learning model. Optionally, in 210 processing unit 101 applies at least one statistical analysis method to the transformed input data to identify the at least some of plurality of environment classes 261, plurality of moving agent classes 262 and plurality of movement pattern classes 263 using the at least one machine learning model.

Optionally, in 210 processing unit 101 further uses the one or more labels when analyzing the transformed input data. For example, when some of the real input data is labeled as an urban area, analyzing the transformed data optionally increases an emphasis on identifying one or more road features in the some of the real input data. In another example, when some other of the real input is labeled as an open field, analyzing the transformed data optionally decreases an emphasis on identifying one or more other road features in the some other of the real input data.

Optionally, in 210 processing unit 101 analyzes the real input data instead of the transformed input data to identify plurality of environment classes 261, plurality of moving agent classes 262 and plurality of movement pattern classes 263.

In 221, processing unit 101 optionally computes a real statistical fingerprint using the real input data, such that the real statistical fingerprint is indicative of one or more characteristics of the one or more driving environments for practical comparison purposes. Optionally, the real statistical fingerprint is computed using the plurality of environment values and the plurality of agent values.

In 222, processing unit 101 optionally generates a training environment according to one environment class 264 of plurality of environment classes 261. The model may be created according to one of the identified environment classes. Optionally, environment class 264 is an intersection of two or more other environment classes of plurality of environment classes 261. For example, plurality of environment classes 261 may comprise an environment class of "daytime", an environment class of "San Francisco" and an environment class of "San Francisco at daytime". In this example. environment class 264 may be "San Francisco at daytime".

In 225, processing unit 101 optionally generates a plurality of generated training agents, each associated with one of plurality of moving agent classes 262 and one of plurality of movement pattern classes 263. Optionally, in 227 processing unit 101 uses a simulation generation model to generate a simulated driving environment according to the training environment generated in 222 and the plurality of generated training agents generated in 225.

Figure 3:
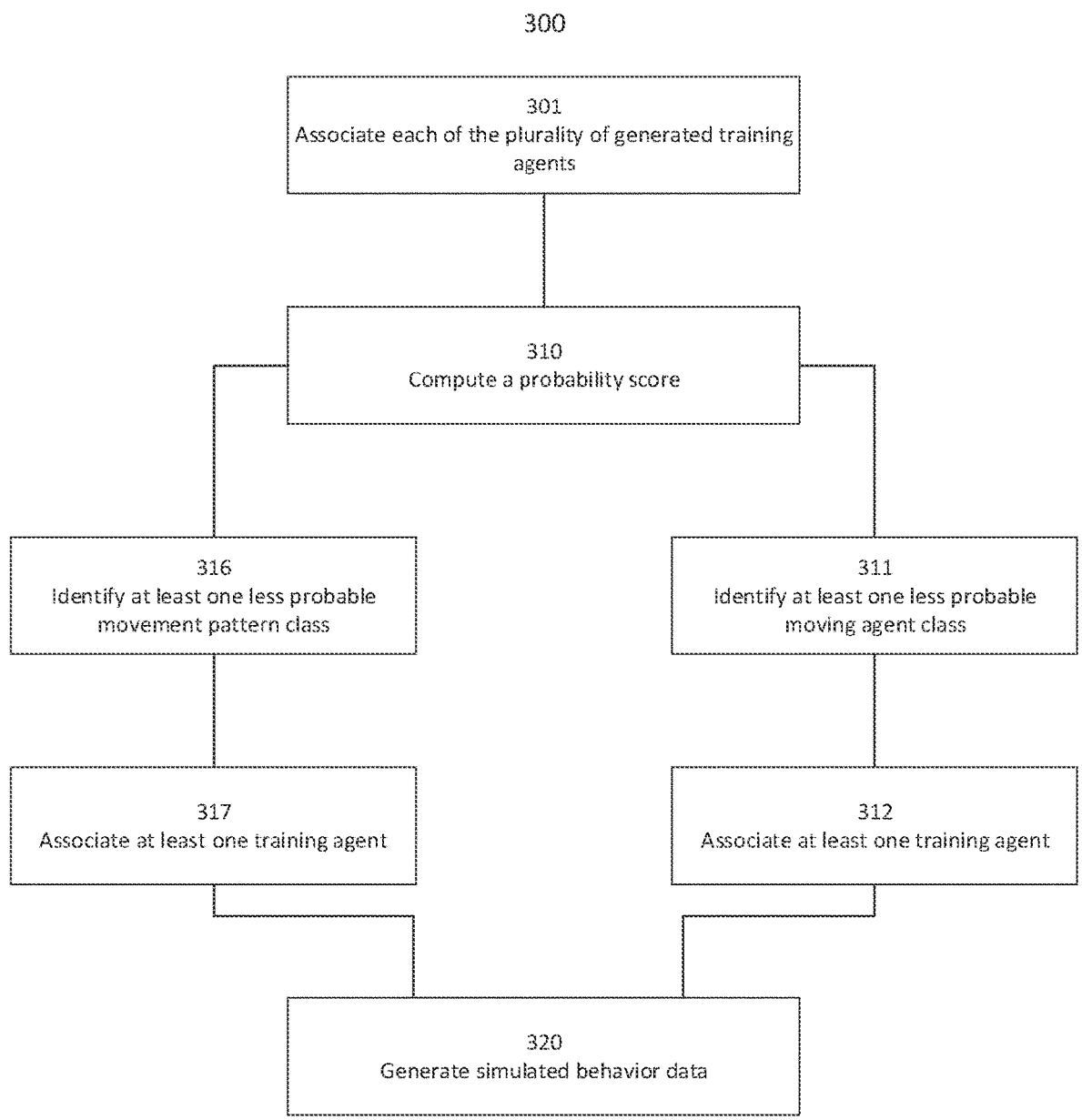
FIG. 3 is a flowchart schematically representing an optional flow of operations for generating agents, according to some embodiments of the present invention.

Reference is now made also to FIG. 3, showing a flowchart schematically representing an optional flow of operations 300 for generating a plurality of agents, according to some embodiments of the present invention. Processing unit 101 optionally selects an amount of the plurality of generated training agents according to an environment value of the training environment indicative of an amount of vehicles, and additionally or alternatively an amount of pedestrians, in an identified amount of time in the training environment.

In 301, processing unit 101 optionally associates each of the plurality of generated training agents with a moving agent class of the plurality of moving agent classes and a movement pattern class of the plurality of movement classes. In 320, processing unit 101 optionally generates for each of the plurality of generated training agents simulated behavior data. Optionally, the simulated behavior data is in accordance with the plurality of agent probabilities of the respective moving agent class according to environment class 261. Optionally, the simulated behavior data is in accordance with the plurality of actor probabilities of the respective movement pattern class according to environment class 261.

Optionally, in 310 processing unit 101 computes for each of the plurality of moving agent classes and each of the plurality of movement pattern classes a probability score. Optionally, in 301 processing unit 101 associates a generated training agent of the plurality of generated training agents with a moving agent class of the plurality of moving agent classes according to the respective probability score of the moving agent class, optionally according to an initial agent probability in accordance with the respective probability score. Optionally, in 301 processing unit 101 associates a generated training agent of the plurality of generated training agents with a movement pattern class of the plurality of movement pattern classes according to the respective probability score of the movement pattern class, optionally according to an initial actor probability in accordance with the respective probability score. Optionally, in 311, processing unit 101 identifies one or more less probable moving agent classes of the plurality of moving agent classes according to the respective probability scores. Optionally, in 312 processing unit 101 associates one or more of the plurality of generated training agents with one of the one or more less probable moving agent classes according to an agent probability higher than the initial agent probability. Optionally, in 316, processing unit 101 identifies one or more less probable movement pattern classes of the plurality of movement pattern classes according to the respective probability scores. Optionally, in 317 processing unit 101 associates one or more of the plurality of generated training agents with one of the one or more less probable movement pattern classes according to an actor probability higher than the initial actor probability.

Reference is now made again to FIG. 2. Processing unit 101 optionally collects in 229 simulated driving data from the simulated driving environment. In 231 processing unit 101 optionally computes a simulation statistical fingerprint using the simulated driving data. Optionally, the simulated driving data comprises simulated environment data describing the simulated driving environment. Optionally, the simulated environment data comprises a plurality of simulation environment values of the plurality of environment attributes describing the simulated driving environment. Optionally, the simulated driving data comprises simulation agent data, describing the plurality of generated training agents. Optionally, the generated training agent data comprises for each of the one or more generated training agents a plurality of agent attributes describing an appearance of the respective generated training agent and a behavior in the simulated driving environment of the respective generated training agent. Optionally, processing unit 101 computes the simulation statistical fingerprint in 231 using the plurality of simulation environment attribute values and the plurality of simulation agent values.

In 235, processing unit 101 optionally modifies one or more model parameters of the simulation generation model to minimize a difference between the real statistical fingerprint computed in 221 and the simulation statistical fingerprint computed in 231.

Optionally, processing unit 101 repeats 227, 229, 231 and 235 in one or more of a plurality of training iterations.

According to some embodiments of the present invention, system 100 may train more than one simulation model, for more than one environment.

Figure 4:
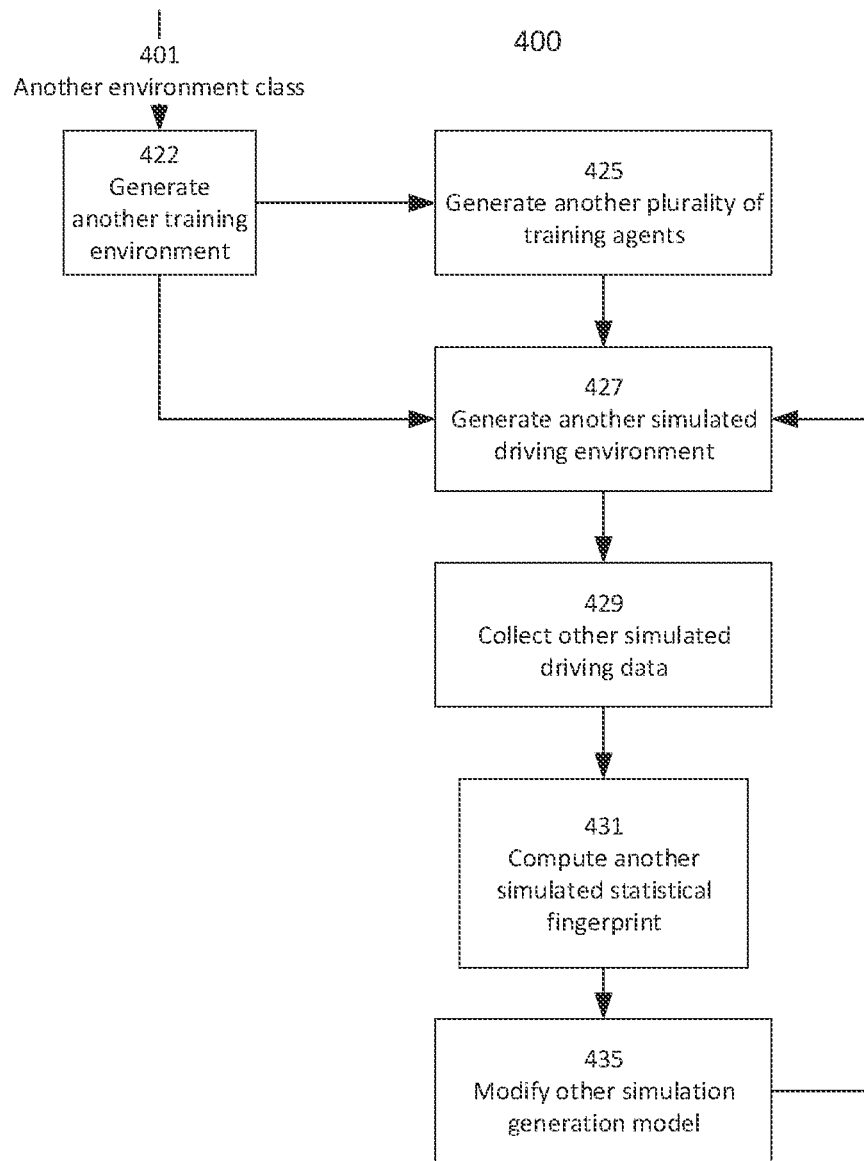
FIG. 4 is flowchart schematically representing another optional flow of operations for training a model for generating simulation data, according to some embodiments of the present invention.

Reference is now made also to FIG. 4, showing a flowchart schematically representing another optional flow of operations 400 for training another model for generating simulation data, according to some embodiments of the present invention. In such embodiment, processing unit 101 generates in 422 another training environment according to other environment class 401 of plurality of environment classes 261. Optionally, other environment class 401 is an intersection of other two or more other environment classes of plurality of environment classes 261. In 425, processing unit 101 optionally generates another plurality of simulated training agents, each associated with one of the plurality of moving agent classes and one of the plurality of movement pattern classes, and in 427 processing unit 101 optionally generates by another simulation generation model another simulated driving environment according to the plurality of other generated training agents and the other training environment. Processing unit 101 optionally collects in 429 other simulated driving data from the other simulated driving environment. In 431 processing unit 101 optionally computes another simulation statistical fingerprint using the other simulated driving data. In 435, processing unit 101 optionally modifies one or more other model parameters of the other simulation generation model to minimize another difference between the real statistical fingerprint computed in 221 and the other simulation statistical fingerprint computed in 431.

Optionally, processing unit 101 repeats 427, 429, 431 and 435 in one or more of a plurality of additional training iterations.

According to some embodiments of the present invention the simulation generation model trained by system 100 using method 200 is used to generate simulation data, for example for training an autonomous driving agent. In such embodiments, a system comprising a first hardware processor implements the following optional method.

Figure 5:
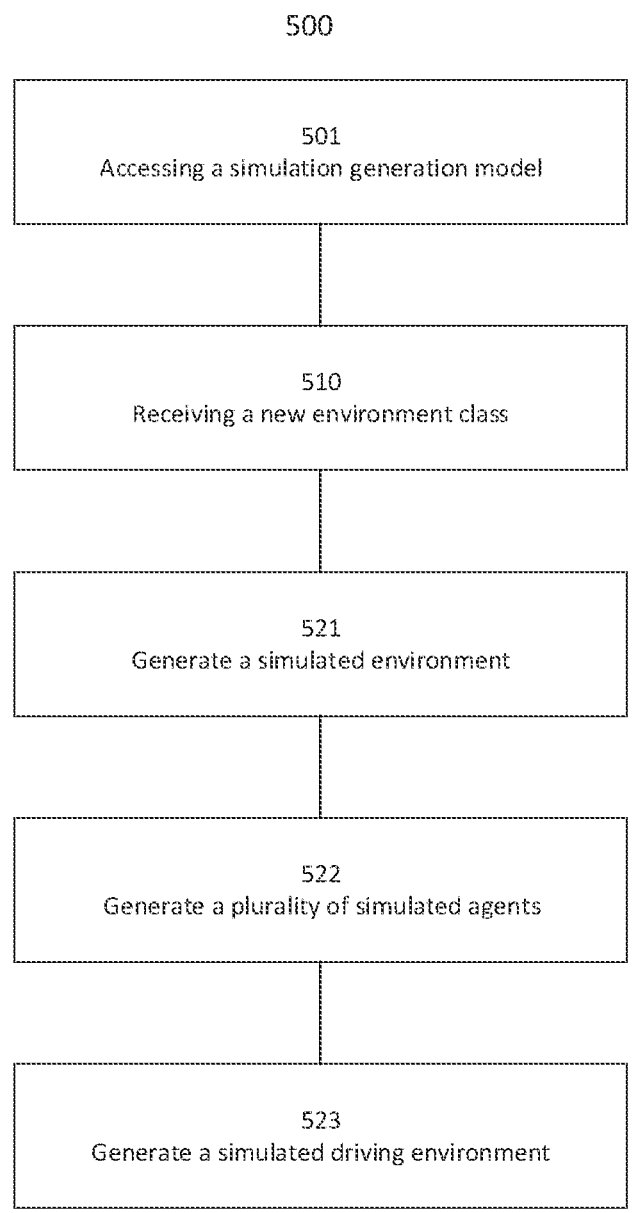
FIG. 5 is a flowchart schematically representing an optional flow of operations for generating simulation data, according to some embodiments of the present invention.

Reference is now made also to FIG. 5, showing a flowchart schematically representing an optional flow of operations 500 for generating simulation data, according to some embodiments of the present invention. In such embodiments, in 501 the first hardware processor accesses a simulation generation model generated by system 100 using method 200. Optionally, in 510 the first hardware processor receives a new environment class of the plurality of environment classes and optionally instructs a second hardware processor to generate the simulated driving environment. Optionally, the first hardware processor is the second hardware processor. Optionally, in 521 the second hardware processor generates a simulated environment, according to the new environment class and in 522 the second hardware processor optionally generates a plurality of simulated agents, each associated with one of another plurality of moving agent classes and one of another plurality of movement pattern classes. Optionally, the other plurality of moving agent classes is the plurality of moving agent classes. Optionally, the other plurality of movement pattern classes is the plurality of movement agent classes. In 523, the second hardware processor optionally generates a simulated driving environment by the simulation generation model according to the simulation environment and the plurality of simulated agents.

To enhance realism of generated simulation data, for example a simulated driving environment, optionally for the purpose of training an autonomous driving agent, in some embodiments of the present invention an image refining model is trained.

Figure 6:
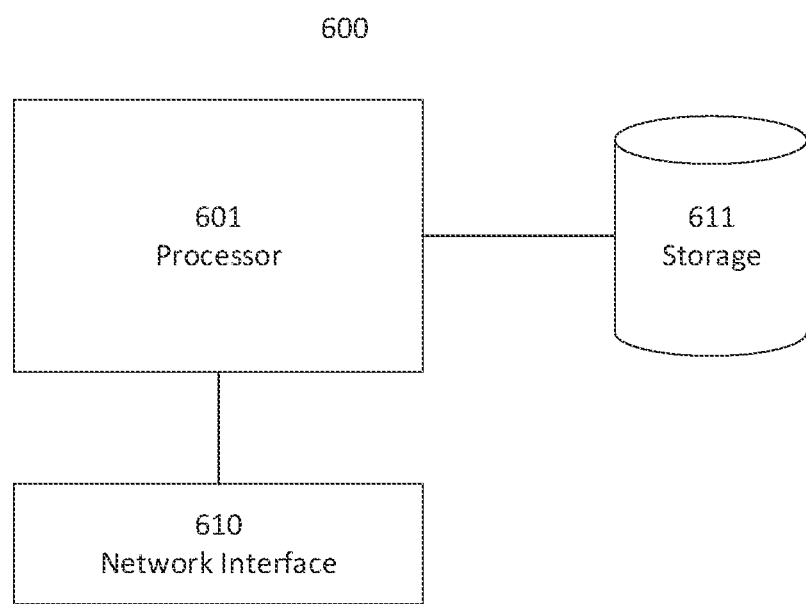
FIG. 6 is a schematic block diagram of an exemplary system for training an image refining model, according to some embodiments of the present invention.

Reference is now made also to FIG. 6, showing a schematic block diagram of an exemplary system 600 for training an image refining model, according to some embodiments of the present invention. In such embodiments, processor 601 is connected to at least one non-volatile digital storage 611. Optionally, processing unit 601 outputs a trained image refining model to at least one non-volatile digital storage 611. Optionally, processing unit 101 retrieves from at least one non-volatile digital storage 611 input data. Optionally the input data comprises a plurality of test images. Optionally the plurality of test images comprises one or more synthetic images. Optionally, processing unit 601 is connected to network interface 610. Optionally, processing unit 601 receives the input from a database or a network connected source via network interface 610. Optionally, processing unit 601 outputs the trained image refining model via network interface 610, for example by sending the trained image refining model to another processing unit. Optionally, network interface 610 is connected to a local area network, for example and Ethernet network or a wireless network. Optionally, network interface 610 is connected to a wide area network, for example the Internet.

To train an image refining model, in some embodiments of the present invention system 600 implements the following optional method.

Figure 7:
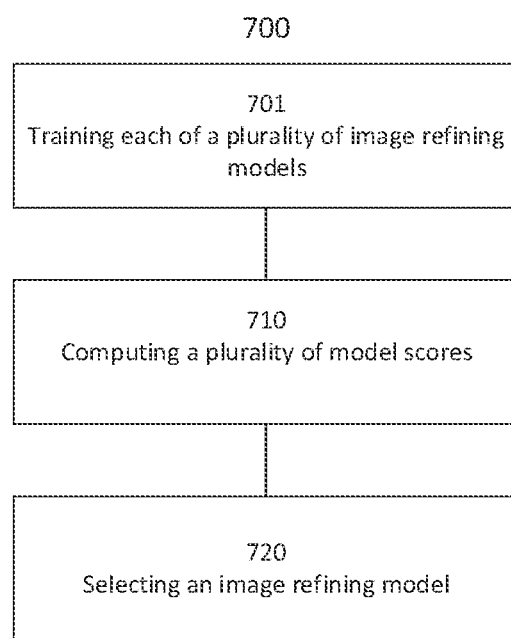
FIG. 7 is a flowchart schematically representing an optional flow of operations for training an image refining model, according to some embodiments of the present invention.

Reference is now made also to FIG. 7, showing a flowchart schematically representing an optional flow of operations 700 for training an image refining model, according to some embodiments of the present invention. In such embodiments, processing unit 601 trains in 701 each of a plurality of image refining models. Optionally, each of the plurality of image refining models is trained to generate a refined image in response to input comprising a synthetic image. Optionally, one or more of the plurality of image refining models use a Generative Adversarial Network (GAN). In 710, processing unit 601 optionally computes a plurality of model scores by computing for each of the plurality of image refining models a model score. Optionally, each model score of the plurality of model scores is indicative of a quality of realism of the respective refined image generated by the respective image refining model in response to input comprising the synthetic image. Optionally, each model score is additionally or alternatively indicative of a quality of content preservation of the respective refined image with reference to the synthetic image.

Figure 8:
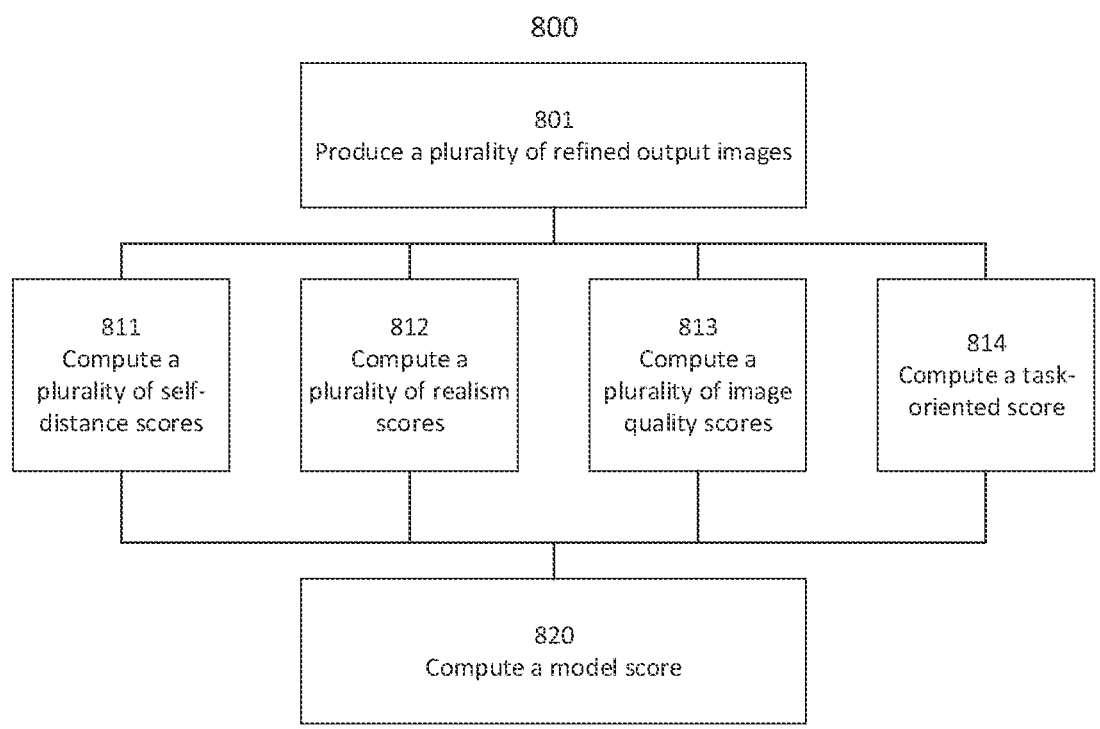
FIG. 8 is a flowchart schematically representing an optional flow of operations for computing a model score of an image refining model, according to some embodiments of the present invention.

Reference is now made also to FIG. 8, showing a flowchart schematically representing an optional flow of operations 800 for computing a model score of an image refining model, according to some embodiments of the present invention. In such embodiments, processing unit 601 produces in 801 a plurality of refined output images, each generated of the respective image refining model in response to input comprising one of a plurality of test images. In 820, processing unit 601 optionally computes the model score, using one or more of: a plurality of image self-distance scores, a plurality of realism scores, a plurality of image quality scores, and a task-oriented score.

An image self-distance score of a refiner measures how well a refined image generated by the refiner in response to an input image preserves content of the input image. In 811, processing unit 601 optionally computes a plurality of image self-distance scores, each indicative of a quality of content preservation in one of the plurality of refined output images with reference to the respective test image of the plurality of test images. Optionally each of the plurality of image self-distance scores is normalized in a range from 0 to 1.

A realism score of a refiner measures how realistic a refined image generated by the refiner in response to an input image appears. In 812, processing unit optionally computes a plurality of realism scores, each indicative of a quality of realism of one of the plurality of refined output images. Optionally each of the plurality of realism scores is normalized in a range from 0 to 1. Optionally, computing the plurality of realism scores comprises computing a plurality of feature scores, each indicative of a distance between a plurality of refined features and a plurality of features extracted from a target real image, where the plurality of refined features are in one of the plurality of refined output images generated in response to a test image of the plurality of test images and the target real image is equivalent to the test image. Optionally, one or more of the plurality of feature scores is a Frechet Inception Distance (FID). A corrupted image is an image that had noise introduced in to it—random noise that corrupts some of the pixels of the image. Some corruption patterns include blurring, and creating artefacts. Optionally, computing the plurality of realism scores comprises computing a plurality of reconstructions scores. Optionally, each of the reconstruction scores is indicative of a difference between a refined image of the plurality of refined output images and a reconstructed image. Optionally, the reconstructed image is reconstructed from a corrupted refined image by a reconstruction model trained to reconstruct real images.

Optionally, to compute a reconstruction score processing unit 601 accesses an image reconstruction model. Optionally, the image reconstruction is trained using real images (photos) to learn a distribution of characteristics of a real environment. The distribution of characteristics is reflected in the reconstruction model's weight values. Optionally, the image reconstruction model is additionally or alternatively trained using a set of corrupted real images (generated by corrupting each of a set of real images) and in a plurality of reconstruction training iterations the image reconstruction model is trained to reconstruct each of the real images. A distance function between an original real image and the respective reconstructed image is optionally used to measure success of reconstruction. Optionally, the image reconstruction model is a de-noising auto-encoder model.

Optionally, for each of the plurality of test images, processing unit 601 corrupts the respective refined output image, and uses the image reconstruction model to output a respective reconstructed image in response to input comprising the respective corrupted refined image. Processing unit 601 optionally computes a reconstruction score indicative of an amount of errors in the reconstructed image compared to the refined image. A small amount of errors is indicative of a refined output image fitting a distribution that the refiner learned from real data, thus indicating a greater degree of realism of the respective refined output image.

An image quality score of an image assesses one or more quality metrics of the image including, but not limited to, noise, blurriness, distortion artifacts. Optionally, processing unit 601 computes in 813 a plurality of image quality scores, each indicative of an image quality of one of the plurality of refined output images. Optionally each of the plurality of image-quality scores is normalized in a range from 0 to 1.

A task-oriented score of a refiner is indicative of a quality of an output of the refiner with respect to an identified task, for example training a classifier. In 814, processing unit 601 optionally computes a task oriented score. Optionally, computing the task oriented score comprises computing a training score of a first classifier model, trained using the plurality of refined output images, where the task oriented score is indicative of a success rate of the first classifier classifying a plurality of real images. Optionally, computing the task oriented score comprises computing a testing score of a second classifier model, trained using the plurality of real images, indicative of a success rate of the second classifier model classifying the plurality of refined output images. Optionally, processing unit 601 computes the task-oriented score using the training score and the testing score. The first classifier, and additionally or alternatively the second classifier, may be a semantic segmentation classifier trained to provide a semantic classification of each pixel of an input image. Optionally, the training score is a first F1 score indicative of a first percentage of pixels of each of the plurality of refined output images classified correctly by the first classifier model. Optionally, the testing score is a second F1 score indicative of a second percentage of pixels of each of the plurality of real images classified correctly by the second classifier model.

In 820, processing unit 601 optionally computes the model score using a combination of one or more of the plurality of image self-distance scores, the plurality of feature scores, the plurality of image quality scores and the task-oriented score. Optionally, processing unit 601 computes a weighted combination of the image self-distance scores, the realism scores, the image quality scores and the task oriented score. The weighted combination may reflect a tradeoff between one or more qualities of a set of refined output images generated by the refiner in response to the plurality of test images. Computing the model score optionally comprises computing one or more of a sum, an average and a standard deviation of one or more of the plurality of image self-distance scores, the plurality of realism scores and the plurality of image quality scores.

Reference is now made again to FIG. 8. In 720, processing unit 601 optionally selects an image refining model of the plurality of image refining models having a preferred model score of the plurality of model scores. Optionally, processing unit 601 outputs the selected image refining model, optionally via network interface 610 and alternatively or additionally optionally by storing the image refining model to at least one non-volatile digital storage 611.

Optionally, processing unit 601 provides the selected image refining model to at least one other processing unit for the purpose of performing an image refinement task, for example for the purpose of generating a simulated driving environment.

Figure 9:
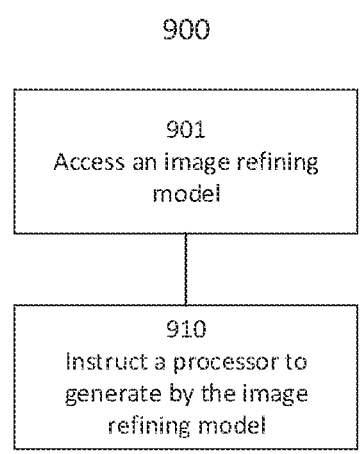
FIG. 9 is a flowchart schematically representing another optional flow of operations for generating simulation data, according to some embodiments of the present invention.

Reference is now made to FIG. 9, showing a flowchart schematically representing another optional flow of operations 900 for generating simulation data, according to some embodiments of the present invention. In such embodiments, in 901 a simulation generation processing unit accesses an image refining model trained by system 600 using method 700. Optionally, in 910 the simulation generation processing unit instructs another simulation generation processing unit to generate by the image refining model at least one refined output image in response to at least one input synthetic image, received via an input interface from an environment generation engine. Optionally, the other simulation generation processing unit is the other simulation generation processing unit. Optionally, the simulation generation processing unit receives the one or more synthetic input images from the environment generation engine via a network interface connected to the simulation generation processing unit. Optionally, the simulation generation processing unit executes the environment generation engine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant autonomous drivers will be developed and the scope of the term "autonomous driver" is intended to include all such new technologies a priori. In addition, it is expected that during the life of a patent maturing from this application many relevant image self-distance scores, realism scores and task oriented scores will be developed and the scope of the terms image self-distance scores, realism scores and task oriented scores is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for training a model, comprising:
   assigning a plurality of movement pattern classes and a plurality of moving agent classes to a set of generated training agents in a training environment for a simulated driving environment;
   identifying in the plurality of moving agent classes at least one less probable moving agent class;
   generating, by a simulation generation model, the simulated driving environment according to the training environment and a plurality of generated training agents, each associated with one of the plurality of moving agent classes and one of the plurality of movement classes;
   associating at least one of the generated training agents with one of the at least one less probable moving agent class; and
   training an autonomous driving agent using the simulated driving environment.

2. The method of claim 1, further comprising training the simulation generation model using the simulated driving environment.

3. The method of claim 1, further comprising analyzing real input data, collected from a driving environment, to identify a plurality of environment classes, the plurality of moving agent classes and the plurality of movement pattern classes.

4. The method of claim 3, wherein the training environment is generated according to one environment class of the plurality of environment classes.

5. The method of claim 4, wherein at least some of the plurality of environment classes, the plurality of moving agent classes and the plurality of movement pattern classes are identified using at least one machine learning model to analyze the real input data.

6. The method of claim 4, wherein at least some of the plurality of environment classes, the plurality of moving agent classes and the plurality of movement pattern classes are identified by applying at least one statistical analysis method to the real input data.

7. The method of claim 4, wherein the real input data further comprises at least one label indicative of one or more environmental conditions when at least some of the real input data is collected from the driving environment; and
   wherein analyzing the real input data comprises using at least some of the at least one label.

8. The method of claim 3, further comprising collecting simulated driving data from the simulated driving environment;
   wherein training the simulation generation model using the simulated driving environment comprises modifying at least one model parameter of the simulation generation model to minimize a difference between a simulation statistical fingerprint, computed using the simulated driving data, and a real statistical fingerprint, computed using the real input data.

9. The method of claim 8, wherein the real input data comprises environment data and agent data;
   wherein the environment data comprises a plurality of environment values of a plurality of environment attributes describing the driving environment; and
   wherein the agent data comprises for each of a plurality of agents operating in the driving environment a plurality of agent values of a plurality of agent attributes, each plurality of agent values describing an appearance of the respective agent and a behavior in the driving environment of the respective agent.

10. The method of claim 9, wherein at least one of the plurality of environment values is selected from a group of environment values consisting of: a time of day value, a day of week value, a month of year value, a temperature value, an air clarity metric value, a precipitation value, a precipitation type value, a wind velocity value, a wind direction value, an amount of light value, an artificial light indication value, a crowd density metric value, an incline value, a curve direction value, a curve radius value, and a road horizontal angle value.

11. The method of claim 9, wherein at least one of the plurality of agent values is selected from a group of agent values consisting of: a height value, a width value, a longitudinal velocity value, a lateral velocity value, a longitudinal acceleration value, a lateral acceleration value, a longitudinal distance value, a lateral distance value, a longitudinal direction value, a lateral direction value, a traffic rule violation indication value, an opposite lane indication value, a shoulder indication value, a collision indication value, an amount of passes of other agents, a transition time value, a transition delay time value, an outbound transition angle value, and an inbound transition angle value.

12. The method of claim 9, wherein each of the plurality of environment classes comprises at least some of the plurality of environment values.

13. The method of claim 9, wherein each of the plurality of moving agent classes describes a moving agent selected from a group of possible moving agents consisting of: a car, a truck, a motorized vehicle, a train, a boat, an air-born vehicle, a waterborne vessel, a motorized scooter, a scooter, a bicycle, and a pedestrian; and
   wherein each of the plurality of moving agent classes comprises a plurality of agent probabilities, each agent probability indicative of a likelihood of a moving agent associated with the respective moving agent class to demonstrate an agent behavior described by an identified plurality of agent values of the plurality of agent values when the driving environment is described by a first environment class of the plurality of environment classes.

14. The method of claim 9, wherein each of the plurality of movement pattern classes describes an actor selected from a group of possible actors consisting of: a pedestrian, a bicycle rider, a vehicle driver; and
   wherein each of the plurality of movement pattern classes comprises a plurality of actor probabilities, each actor probability indicative of a likelihood of an actor associated with the respective movement pattern class to demonstrate an actor behavior described by an identified movement pattern plurality of agent values of the plurality of agent values when the driving environment is described by a second environment class of the plurality of environment classes.

15. The method of claim 9, wherein analyzing the real input data comprises applying a transformation to the plurality of agent values.

16. The method of claim 9 wherein the real statistical fingerprint is computed using the plurality of environment values and the plurality of agent values.

17. The method of claim 9 wherein the simulated driving data comprises simulated environment data and simulated agent data;
   wherein the simulated environment data comprises a plurality of simulated environment values of the plurality of environment attributes describing the simulated driving environment;
   wherein the simulated agent data comprises for each of the plurality of generated training agents a plurality of simulated agent values of the plurality of agent attributes, each plurality of simulated agent values describing an appearance of the respective generated training agent and a behavior in the simulated driving environment of the respective generated training agent; and
   wherein the simulation statistical fingerprint is computed using the plurality of simulation environment attribute values and the plurality of simulation agent values.

18. The method of claim 9, further comprising:
   generating another training environment, according to another environment class of the plurality of environment classes;
   generating, by another simulation generation model, another simulated driving environment according to the other training environment and according to a plurality of other generated training agents, each associated with one of the plurality of moving agent classes and one of the plurality of movement pattern classes;
   collecting other simulated driving data from the other simulated driving environment; and
   modifying a plurality of other model parameters of the other simulation generation model to minimize another difference between another simulation statistical fingerprint, computed using the other simulated driving data, and the real statistical fingerprint, computed using the real input data.

19. The method of claim 1, wherein generating the simulated driving environment according to the plurality of generated training agents comprises:
   associating each of the plurality of generated training agents a moving agent class of the plurality of moving agent classes and a movement pattern class of the plurality of movement classes; and
   generating for each of the plurality of generated training agents simulated behavior data in accordance with: 1) a plurality of agent probabilities of the respective moving agent class according to the one environment class, and 2) a plurality of actor probabilities of the respective movement pattern class according to the one environment class.

20. The method of claim 1, further comprising computing a probability score for each of the plurality of moving agent classes and each of the plurality of movement pattern classes;
   wherein identifying in the plurality of moving agent classes the at least one less probable moving agent class is conducted according to the respective probability score; and
   wherein a movement pattern class of the plurality of movement pattern classes is associated with a generated training agent according to the respective probability score.

21. The method of claim 20,
   wherein
   associating the at least one of the generated training agents with one of the at least one less probable moving agent class is conducted according to an agent probability higher than an initial agent probability in accordance with the respective probability score.

22. The method of claim 21, further comprising:
   identifying in the plurality of movement pattern classes at least one less probable movement pattern classes according to the respective probability score; and
   associating at least one of the generated training agents with one of the at least one less probable movement pattern classes according to an actor probability higher than an initial actor probability in accordance with the respective probability score.

23. A system for training a model, comprising at least one hardware processor adapted to:
   assigning a plurality of movement pattern classes and a plurality of moving agent classes to a set of generated training agents in a training environment for a simulated driving environment;

identifying in the plurality of moving agent classes at least one less probable moving agent class;

generating, by a simulation generation model, the simulated driving environment according to the training environment and a plurality of generated training agents, each associated with one of the plurality of moving agent classes and one of the plurality of movement classes;

associating at least one of the generated training agents with one of the at least one less probable moving agent class; and training an autonomous driving agent using the simulated driving environment.

24. The system of claim 23, wherein the at least one hardware processor is further adapted to analyzing real input data, collected from a driving environment, to identify the plurality of moving agent classes and the plurality of movement pattern classes; and wherein the real input data comprises real data collected by at least one sensor selected from a group of sensors comprising: a camera, an electromagnetic radiation sensor, a radar, a Light Detection and Ranging (LIDAR) sensor, a microphone, a thermometer, an accelerometer, and a video camera.

25. The system of claim 24, wherein the at least one hardware processor is further adapted to receiving the real input data via at least one digital communication network interface connected to the at least one hardware processor.

26. The system of claim 25, wherein the at least one hardware processor is further adapted to output the simulation generation model via the at least one digital communication network interface.

27. The system of claim 23, wherein the at least one hardware processor is further adapted to output the simulation generation model to a non-volatile digital storage connected to the at least one hardware processor.

* * * * *